(12) United States Patent
Tsai

(10) Patent No.: US 8,009,878 B2
(45) Date of Patent: Aug. 30, 2011

(54) WARNING APPARATUS AND METHOD FOR AVOIDING EYE STRESS

(75) Inventor: Chao-Lien Tsai, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 898 days.

(21) Appl. No.: 12/014,633

(22) Filed: Jan. 15, 2008

(65) Prior Publication Data

US 2009/0116735 A1 May 7, 2009

(30) Foreign Application Priority Data

Nov. 5, 2007 (CN) .......................... 2007 1 0202378

(51) Int. Cl.
*G06K 9/00* (2006.01)
(52) U.S. Cl. ........................................................ 382/117
(58) Field of Classification Search .......... 382/117–118, 382/199, 209, 218; 345/10, 11
See application file for complete search history.

(56) References Cited

U.S. PATENT DOCUMENTS

| 6,483,485 B1* | 11/2002 | Huang et al. ............... 345/10 |
| 7,003,139 B2* | 2/2006 | Endrikhovski et al. ....... 382/118 |
| 2006/0210121 A1* | 9/2006 | Nakano et al. ............. 382/117 |

FOREIGN PATENT DOCUMENTS

| JP | 8266468 A | 10/1996 |
| TW | 200729074 A | 1/2006 |
| TW | 200735820 A | 3/2006 |

OTHER PUBLICATIONS

Jung-Tang Huang et al. "Human Face Recognition and Ellipse Matching to Protect Human Eyes" The 21st Science Proseminar Symposium of Chinese Mechanical Engineering Institute Nov. 26, 2004 to Nov. 27, 2004.

* cited by examiner

*Primary Examiner* — Daniel Mariam
(74) *Attorney, Agent, or Firm* — Atlis Law Group, Inc.

(57) ABSTRACT

An exemplary warning method for avoiding eye stress of a computer user includes: capturing a number of consecutive images of the face of a computer user; processing the images to obtain a number of values each indicative of a degree of openness of the eyes of the computer user; counting an amount of values exceeding a predetermined threshold to obtain accumulated viewing time of the computer user; and triggering a warning means if the accumulated viewing time of the computer satisfies a predetermined condition.

13 Claims, 4 Drawing Sheets

WARNING APPARATUS AND METHOD FOR AVOIDING EYE STRESS

BACKGROUND

1. Technical Field

The invention relates to methods/apparatuses for avoiding eye stress and, in particular, relates to a warning method and apparatus for avoiding eye stress of computer users.

2. Description of Related Art

Computer users often experience headaches, blurred vision, and other visual symptoms related to eye stress from prolonged viewing of the computer screen. In order to reduce these symptoms, it is suggested that computer users take frequent breaks from the computer (e.g., step away from the computer for 15 minutes during each two-hour period or for 10 minutes per hour of intensive work). But this may be inconvenient or difficult to remember for computer users.

Therefore, it is desirable to provide a warning method and a warning apparatus, which can overcome the abovementioned problem.

SUMMARY

In a present embodiment, a warning method for avoiding eye stress of computer user is disclosed. The warning method includes: capturing a number of consecutive images of the face of a computer user; processing the images to obtain a number of values each indicative of a degree of openness of the eyes of the computer user; counting an amount of values exceeding a predetermined threshold to obtain accumulated viewing time of the computer user; and triggering a warning means if the accumulated viewing time of the computer satisfies a predetermined condition.

BRIEF DESCRIPTION OF THE DRAWINGS

Many aspects of the present warning apparatus and warning method should be better understood with reference to the following drawings. The components in the drawings are not necessarily drawn to scale, the emphasis instead being placed upon clearly illustrating the principles of the present warning apparatus and warning method. Moreover, in the drawings, like reference numerals designate corresponding parts throughout the several views.

DETAILED DESCRIPTION OF THE EMBODIMENTS

Embodiments of the present warning apparatus and method will now be described in detail with reference to the drawings.

Figure 1:
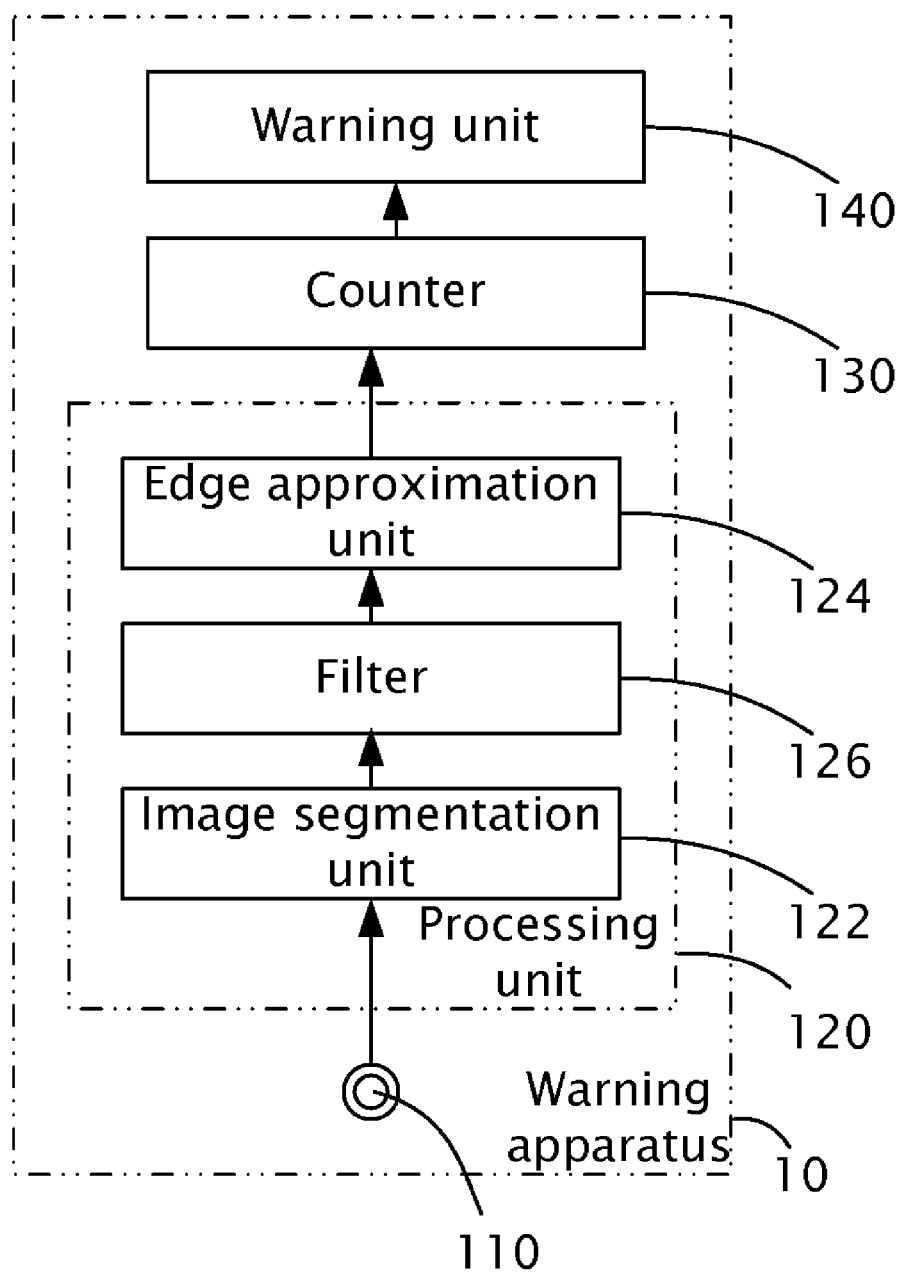
FIG. 1 is a functional diagram of a warning apparatus for avoiding eye stress, according to an exemplary embodiment.

Referring to FIG. 1, a warning apparatus 10 in accordance with an embodiment includes an imaging unit 110, a processing unit 120, a counter 130, and a warning unit 140. The imaging unit 110 is configured to capture a number of consecutive facial images of a computer user. The processing unit 120 is configured to process the facial images to obtain a number of values each indicative of a degree of openness of the eyes of the computer user while directed at a screen of the computer. The counter 130 is configured to count an amount of values exceeding a predetermined threshold to obtain accumulated viewing time of the computer user. The warning unit 140 is configured to trigger a warning means if the accumulated viewing time of the computer user satisfies a predetermined condition.

Specifically, the processing unit 120 includes an image segmentation unit 122, and an edge approximation unit 124. The image segmentation unit 122 is configured to segment a facial image to detect/find the edge of the eyes in the captured image. The edge approximation unit 124 is configured to measure the distance between the detected edges of the eyes, to determine the degree of openness of the eyes, as the value. Opportunely, the processing unit 120 further includes a filter 126 such as mean filter. This filter 126 is configured to filter the segmented facial image so that noise in the facial image, which may cause errors, is removed before edge approximation is performed. If the users eyes are closed or averted from the screen, or the user is away from the computer, then it is determined that the user is not viewing the display of the computer at that time, then accumulated viewing time is not incremented.

Figure 2:
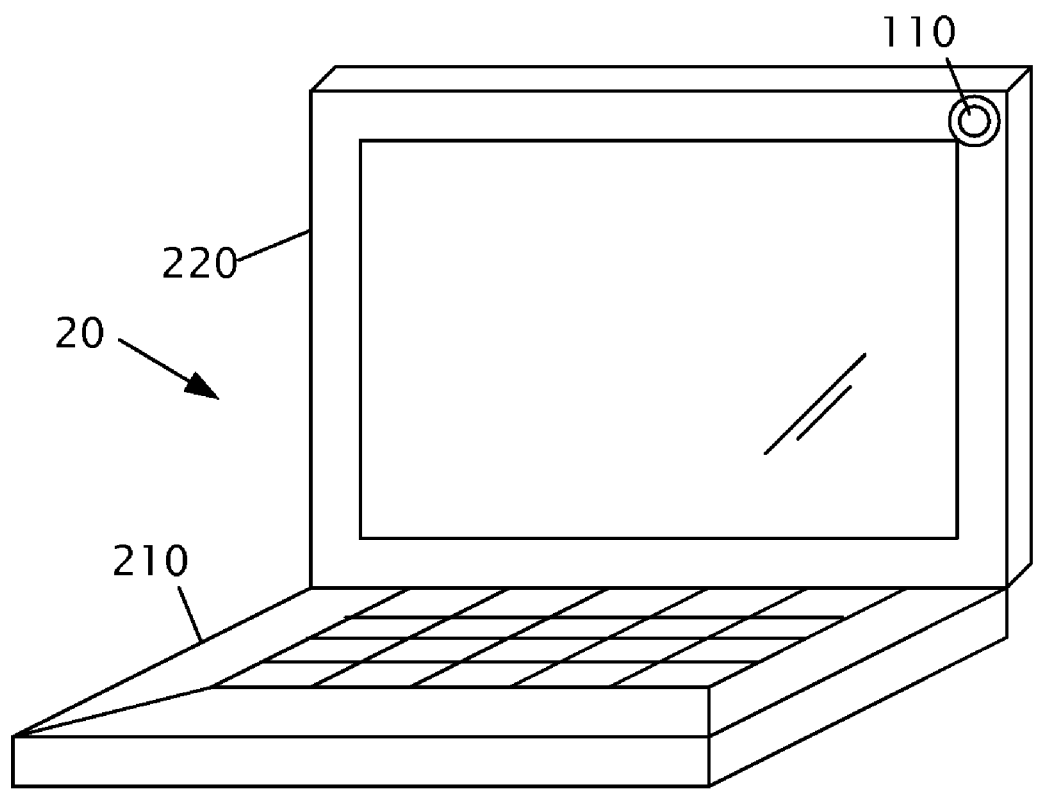
FIG. 2 is a schematic, isometric view of a computer using the warning apparatus of FIG. 1.

Referring to FIG. 2, in this illustrated embodiment, the warning apparatus 10 is applied to a notebook 20. This notebook 20 typically includes a main body 210, and a liquid crystal display (LCD) 220. It is to be noted that the warning apparatus 10 also can be applied to other processor-based device that includes a display, e.g., desktop computer. The imaging unit 110 is a video camera, and is mounted on the edge of the LCD 220 (e.g., left top corner) so as to capture facial images of the computer user when facing the display 220. The processing unit 120, the counter 130, and the warning unit 140 can be software instructions, which can be in a variety of software languages, including C, C++, Java, Visual Basic, and many others, stored in, e.g., a hard disk of the main body 210. The imaging unit 110 is electrically connected to a circuit board of the main body 210, and thereby is communicated with the processing unit 120. Understandably, the components of the warning apparatus 10 such as imaging unit 110, the processing unit 120, the counter 130, and the warning unit 140 are not limited to this illustrated embodiment, but could conform to other available components, e.g., an integrated circuit that is capable of performing the described processing, counting, and warning functions.

Figure 3:
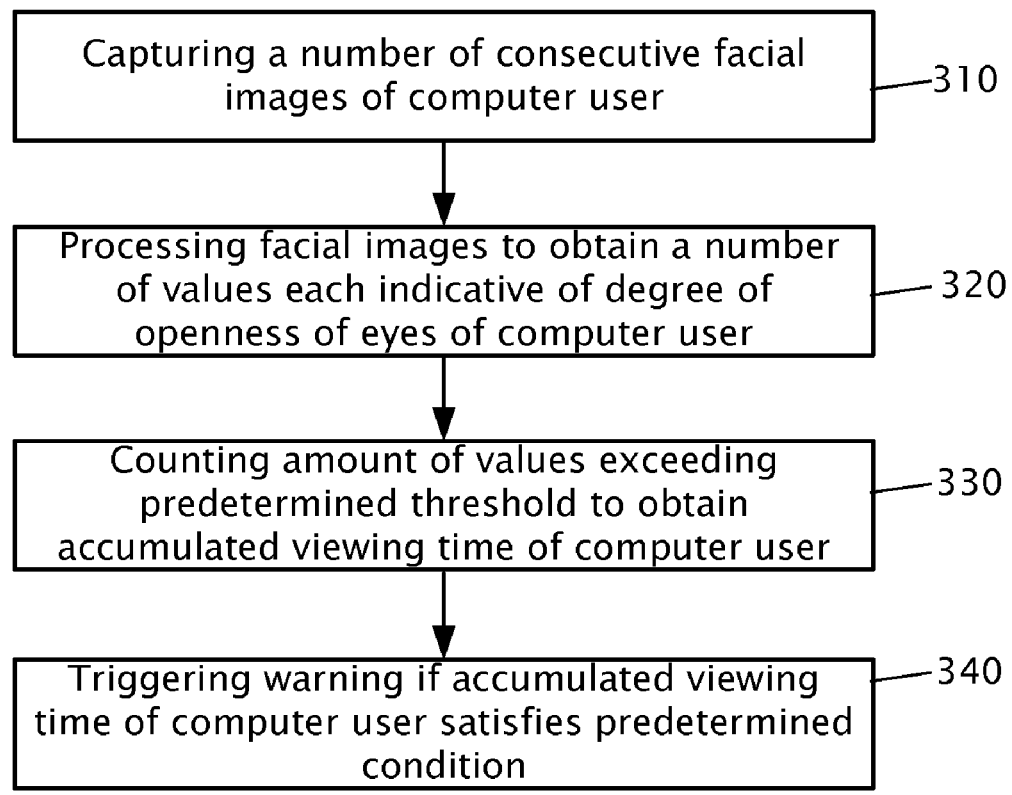
FIG. 3 is a flow chart of a warning method for avoiding eye stress, according to the exemplary embodiment.

Referring to FIG. 3, a warning method for avoiding eye stress of an exemplary embodiment includes the following operations 310~340.

Operation 310: capturing a number of consecutive facial images of a computer user (at the rate of 30 frames per second). This can be carried out by the imaging unit 110. In detail, the warning apparatus 10 can be started by the notebook 20: when the notebook 20 is powered on, the imaging unit 110 starts to capture the facial images and transmits the captured facial images to a DRAM of the main body 210, and the software instructions acting as the processing unit 120, the counter 130, and the warning unit 140 are loaded into the DRAM 20 and are executed in the DRAM to perform the following operations 320~340.

Operation 320: processing the facial images to obtain a number of values each indicative of a degree of openness of the eyes of the computer user. This can be carried out by the processing unit 120 (see the following text).

Operation 330: counting an amount of values exceeding a predetermined threshold to obtain accumulated viewing time of the computer user. This can be carried out by the counter 130. In principle, if the eyes are open and directed at the screen, the degree of openness of the eyes is greater than the predetermined threshold, e.g., 1 cm. Therefore, the accumulated viewing time of the computer user can be measured by this operation.

Operation 340: triggering a warning means if the accumulated viewing time of the computer user satisfies a predetermined condition, such as when 80,000 values exceeding the threshold value are counted for 100,000 images captured (30 fps means approximately 100,000 images captured in an hour). This can be carried out by the warning unit 140. Where the warning means can be a buzzing made by an audio device of the notebook 20 or an individual buzzer added thereto, or a warning window displayed in the notebook 20. The predetermined condition can be set according to user preferences of the computer user or recommendations of the manufacturer. Specifically, in addition to triggering, the warning unit 140 also resets the counter 130 after triggering.

Figure 4:
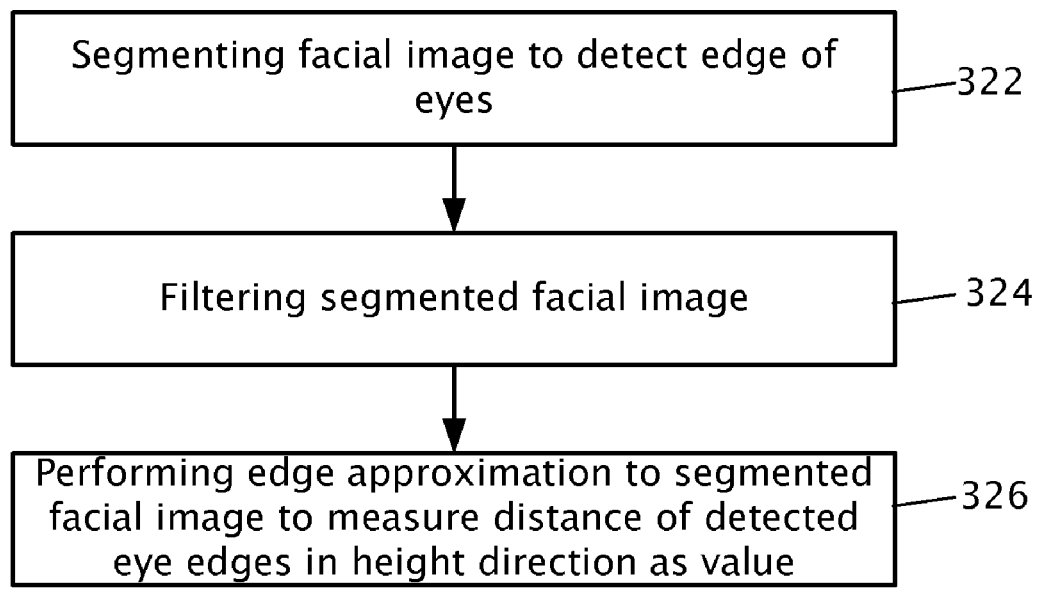
FIG. 4 is a sub-flow chart of the warning method of FIG. 3.

Referring to FIG. 4, the operation 320 can be carried out by the following sub-operations 322~328.

Sub-operation 322: segmenting a facial image to detect the edge of the captured eyes. This can be carried out by the image segmentation unit 122 and various techniques such as thresholding (including fixed threshold, isodata algorithm, background-symmetry algorithm, and triangle algorithm), or edge finding (including Gradient-based procedure using Sobel, Roberts, and Prewitt operator), can be used in this sub-operation.

Sub-operation 324: filtering the segmented facial image so that noise in the segmented facial image is removed. This can be carried out by the mean filter 126.

Sub-operation 326: performing an edge approximation on the segmented facial image to measure the distance between the detected edges of the eyes as the value indicative of openness of the eyes. This can be carried out by the edge approximation unit 124.

The warning apparatus 10 and the warning method measure accumulated viewing time of the computer user and warn the computer user to take a break in the case of prolonged use being detected, and therefore are beneficial for reducing visual symptoms of eye stress related to sustained computer use.

It will be understood that the above particular embodiments and methods are shown and described by way of illustration only. The principles and the features of the present invention may be employed in various and numerous embodiment thereof without departing from the scope of the invention as claimed. The above-described embodiments illustrate the scope of the invention but do not restrict the scope of the invention.

What is claimed is:

1. A warning apparatus for avoiding eye stress of a computer user, the warning apparatus comprising:
    an imaging unit configured for capturing a plurality of consecutive images of the face of the computer user;
    a processing unit configured for processing the plurality of consecutive images to obtain a plurality of values each indicative of a degree of openness of the eyes of the computer user;
    a counter for counting an amount of the values which exceed a predetermined threshold to obtain an accumulated viewing time of the computer user; and
    a warning unit configured to trigger a warning means if the accumulated viewing time of the computer user satisfies a predetermined condition.

2. The warning apparatus as claimed in claim 1, wherein the imaging unit includes a video camera.

3. The warning apparatus as claimed in claim 1, wherein the processing unit comprises:
    an image segmentation unit for segmenting an image of the face to detect the edges of the eyes in the image; and
    an edge approximation unit for performing an edge approximation to the segmented image to measure the distance between the detected edges in obtaining each of the plurality of values, to determine the degree of openness of the eyes.

4. The warning apparatus as claimed in claim 3, wherein the processing unit comprises a filter for filtering the segmented image before the edge approximation is performed.

5. The warning apparatus as claimed in claim 4, wherein the filter is a mean filter.

6. The warning apparatus as claimed in claim 1, wherein the warning means is a buzzing or a pop-up window.

7. A warning method for eye care of a computer user, comprising:
    capturing a plurality of consecutive images of the face of the computer user;
    processing the plurality of consecutive images to obtain a plurality of values each indicative of a degree of openness of the eyes of the computer user;
    counting an amount of the values which exceed a predetermined threshold to obtain an accumulated viewing time of the computer user; and
    triggering a warning means if the accumulated viewing time of the computer user satisfies a predetermined condition.

8. The warning method as claimed in claim 7, wherein the step of processing an image comprises:
    segmenting the image to detect the edge of eyes in the image; and
    performing an edge approximation to the segmented image to measure the distance of detected eye edges in obtaining each of the plurality of values, to determine the degree of openness of the eyes.

9. The warning method as claimed in claim 8, wherein segmenting an image is performed using thresholding technique.

10. The warning method as claimed in claim 9, wherein the thresholding technique is fixed threshold, isodata algorithm, background-symmetry algorithm, or triangle algorithm based.

11. The warning method as claimed in claim 8, wherein processing an image further comprises:
    filtering the segmented image prior to the edge approximation.

12. The warning method as claimed in claim 8, wherein segmenting an image is performed using edge finding technique.

13. The warning method as claimed in claim 12, wherein the edge finding technique uses the Sobel, Roberts, or Prewitt operator.

* * * * *